March 7, 1939.  S. G. PENNINGTON  2,149,404
REVERSIBLE HOUR GLASS INDICATOR
Filed March 2, 1936  2 Sheets-Sheet 1
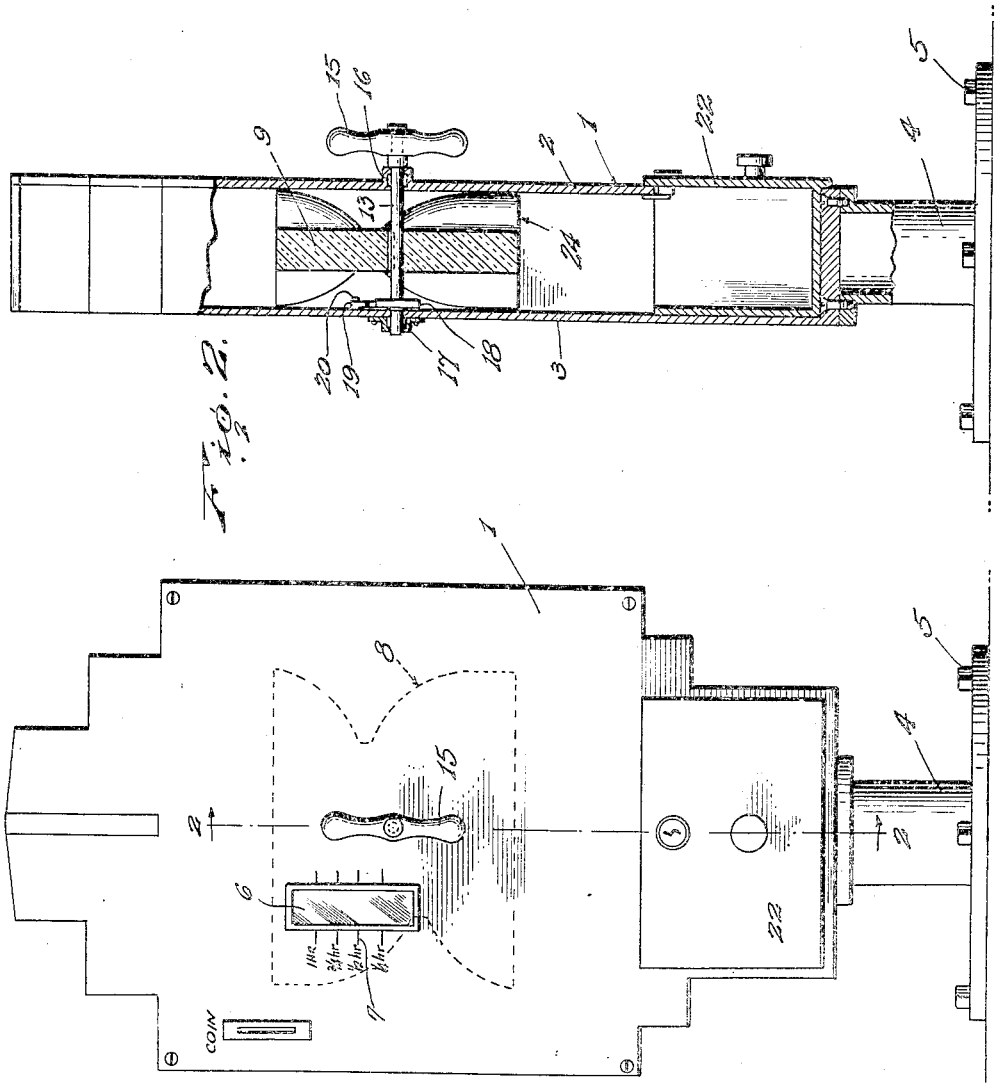
Inventor
S. G. Pennington.
By Lacey & Lacey, Attorneys March 7, 1939.   S. G. PENNINGTON   2,149,404
REVERSIBLE HOUR GLASS INDICATOR
Filed March 2, 1936    2 Sheets-Sheet 2

Inventor
S. G. Pennington.
By Lacey & Lacey
Attorneys

Patented Mar. 7, 1939

2,149,404

UNITED STATES PATENT OFFICE 2,149,404

REVERSIBLE HOUR GLASS INDICATOR

Stephen G. Pennington, Oklahoma City, Okla., assignor to Lulah Darley, Jackson, Miss.

Application March 2, 1936, Serial No. 66,705

7 Claims. (Cl. 161—15)

This invention relates to an improved reversible hour glass indicator and seeks, among other objects, to provide a device of this character which will effectually indicate the passage of time and which, at the end of a predetermined time may be shifted for permitting further indication of time passage.

Another object of the invention is to provide a reversible hour glass indicator employing a casing embodying a pair of hour glasses which are formed as a unit but which are disposed so that time passage indicating sand flow will be in opposite directions.

A further object of the invention is to provide a reversible hour glass indicator which will employ no moving parts for controlling flow of sand from one chamber to another, and wherein the interior of the casing is exhausted so that sand flow will take place in a uniform manner and will not be affected by atmospheric changes.

Another object of the invention is to provide a reversible hour glass indicator which may be quickly turned end for end, after flow of sand from the supply chamber of one of the hour glasses is completed, for permitting simultaneous refilling of said chamber and commencement of time passage indicating flow from the supply chamber of the adjacent hour glass.

Another object of the invention is to provide a reversible hour glass indicator which may be turned end for end at any time so that, when the device is being used for parking, a person entering a parking space may readjust the device to start a new period of sand flow, whether or not the previous flow has been completed.

A further object of the invention is to provide a device of this character which will permit reasonably accurate indications of time passage yet which will be rugged in construction and cheap to manufacture.

And a still further object of the invention is to provide a device of this character wherein the hour glass casing is mounted in a housing and is mounted on a shaft for permitting ready unidirectional shifting movement for changing the position of the hour glasses.

Other and incidental objects of the invention not specifically outlined hereinabove will render themselves apparent during the course of the following description.

My invention is illustrated in the accompanying drawings wherein like numerals of reference designate like parts throughout the several views.

In said drawings:

Figure 1 is a plan view showing a parking meter embodying my improved reversible hour glass indicator as it would appear ready for use.

Figure 2 is a vertical sectional view on the line 2—2 of Figure 1, looking in the direction indicated by the arrows.

Figure 3:
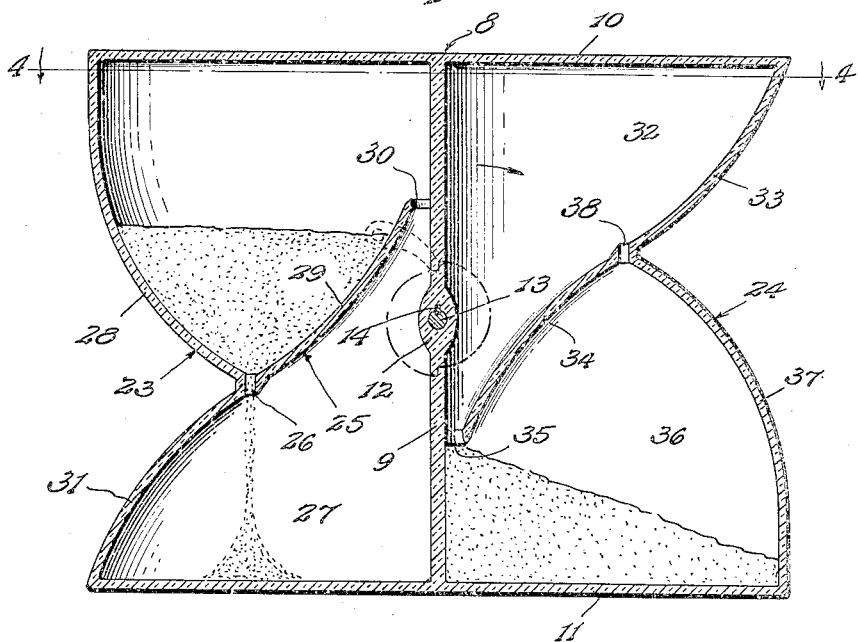
Figure 3 is an enlarged vertical sectional view of my improved reversible hour glass indicator.
Figure 4:
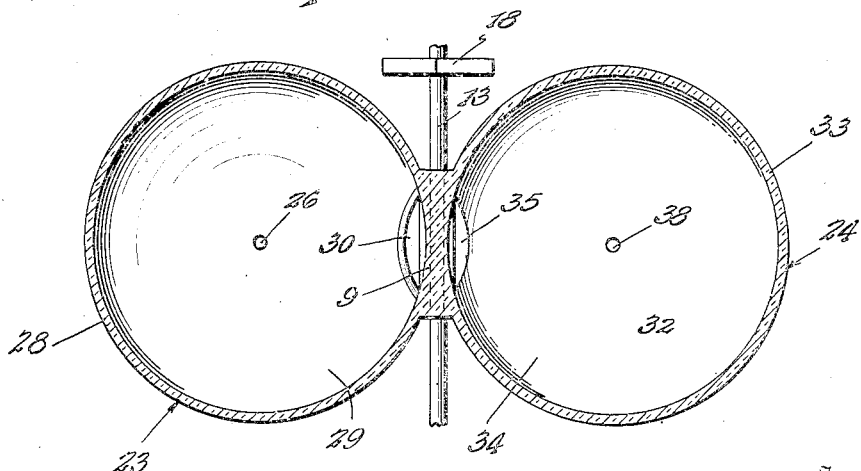
Figure 4 is a horizontal sectional view on the line 4—4 of Figure 3, looking in the direction of the arrows.

Referring now more particularly to the accompanying drawings, the numeral 1 indicates a housing which may be of any suitable design and which will be of rugged construction so as to be able to withstand the rough usage accorded devices placed on city streets.

The housing is provided with flat front and rear walls 2 and 3 and is further provided with a base 4 which is adapted to be secured to a surface by means of bolts 5. A window 6, rectangular in outline and extending vertically substantially medially of the housing, is provided. A scale 7 is imprinted upon the surface of the front wall 2 of the housing adjacent the window.

My improved reversible hour glass indicator is mounted in the housing and comprises a casing 8 which is formed with a central vertically extending wall or partition 9. The casing is formed with a flat top wall 10 and a flat bottom wall 11. The wall 9 is enlarged medially of its length, as shown at 12, to receive a shaft 13, which is locked in the wall 9 by means of a suitable key 14. The shaft 13 is adapted to extend through the front wall 2 of the housing and said shaft is provided at its front end with a handle 15. A bearing 16 journals the front end of the shaft 13. The opposite end portion of the shaft 13 extends through the wall 3 of the housing and is journaled by means of a bearing 17. Adjacent the inner face of the wall 3 is a ratchet wheel 18 carried on the shaft 13, said ratchet wheel being locked on said shaft and being adapted for engagement by a pawl 19 which is pivotally connected with the wall 3 by means of a pin 20. The ratchet wheel 18 is preferably of such construction that the shaft 13 will be prevented from counter-clockwise rotative movement and said ratchet wheel has teeth suitable for permitting turning of the shaft through 180° at each turning movement so that, when the shaft, with the casing thereon, is rotated, said casing will turn end for end at each movement of the handle.

The partition 9 of the casing 8 provides a common inner wall for both of the hour glasses of my invention, one of said hour glasses being indicated at 23 while the other is shown at 24. The walls 10 and 11 extend in opposite directions from the partition 9 and said wall 10 provides a top wall for the hour glass 23 and a bottom wall for the hour glass 24, while the wall 11 provides a bottom wall for the hour glass 23 and a top wall for the hour glass 24. In other words, the casing is so formed that when one of the hour glasses is in upright position the other will be inverted. The hour glass 23, is shown, in Figure 3, as being in upright position with a hopper 25 nearly filled with sand and a portion of said sand flowing through a discharge opening 26 into a receptacle 27 for indicating time passage. The hopper 25 is defined by an outer substantially circular wall 28, which extends throughout substantially two-thirds of the height of the casing 8 and an inner arcuate wall 29 which terminates in a relatively large opening 30 which leads into the receptacle 27. The receptacle 27 is defined by a curved outer wall 31, the wall 11, the curved wall 29, and the partition 9 throughout substantially two-thirds of the height of said partition.

The hour glass 24 is identical in formation with the hour glass 23 but, as stated, is inverted in its relation to said glass 23. In more detail, the hour glass 24 is provided with a receptacle 32 which is defined by a portion of the wall 10, a curved wall 33, a curved inwardly extending wall 34, and the partition 9 throughout substantially two-thirds of its length. As will be seen, the wall 34 is curved in an opposite direction from the wall 33 and is similar to the wall 29 in contour. Both of the walls 29 and 34 extend toward the partition 9 and said wall 34 terminates in a relatively large opening 35 which permits flow of sand from the receptacle 32 into the hopper 36 which is identical in formation with the hopper 25 and is bounded by the wall 11, the partition 9, throughout substantially one-third of its height, the wall 34, and a curved outer wall 37 which extends throughout substantially two-thirds of the height of the casing. A discharge opening 38 leads from the hopper 36 into the receptacle 32.

In use, the housing 1, with the casing mounted therein in such manner that a portion of the hopper of one of the hour glasses will always be disposed in front of the window 6, is placed on a sidewalk near the curb, presuming the device to be used in connection with a parking meter. The handle 15 is rotated 180° for exposing the casing 8 with one of the hoppers full so that flow from said hopper will indicate time passage which may be measured roughly on the scale 7 adjacent the window 6. The ratchet wheel 18 and pawl 19 will permit uni-directional turning movement of the casing so that possible accidental rearward displacement of the sand through the relatively large openings 30 and 35 will be avoided. After one hopper has been emptied, for example, the hopper 25, the device is turned on end in the manner stated for placing the hopper 36 in operative position. Simultaneously with this turning operation, the sand collected in the receptacle 27 will flow through the opening 30 into the hopper 25 so that the glass 23 is ready for operation when the sand has ceased to flow from the hopper 36. This operation is, of course, repeatedly duplicated in the hour glasses 23 and 24 as the casing is turned end for end. Attention is called to the fact that the hour glasses 23 and 24 are both exhausted of air so that the sand will be permitted to flow freely and will not be affected by atmospheric changes. Attention is further called to the fact that the glasses are cast as a single unit and do not require the use of working parts for the control of the sand within the glasses so that the use of float valves, check valves, or the like, will be dispensed with.

The device is characterized by the utmost simplicity and ruggedness and will be simple to manufacture. My invention provides a device whereby an accurate check may be kept on parking meters and also a means whereby, if desired, revenue may be derived from said meter.

Having thus described the invention, what I claim is:

1. In a device of the class described, a casing including hour glasses having a partition defining a common inner wall connecting said glasses, means extending through said partition for rotatably mounting the casing within the housing, each of said hour glasses including a hopper and a receptacle, and a substance carried in each of the hour glasses and being adapted to flow within said hour glasses for indicating the passage of time, the hopper and receptacle of one of said glasses being disposed in inverted relation to the hopper and receptacle of said other glass for permitting one of the hoppers to fill with the substance to be in readiness for a time passage indicating operation after a time passage indicating operation by said other glass.

2. In a device of the class described, a casing including hour glasses having a partition defining a common inner wall, said partition being enlarged, a shaft carried by the casing and extending through the partition, said casing being mounted in the housing and said hour glasses including hoppers and receptacles and one of said hour glasses being inverted with respect to the other of said hour glasses, means carried by the shaft for permitting rotation of the casing within the housing, and a substance carried in the hour glasses and adapted to flow from the hopper of one of said glasses to the receptacle of said glass for indicating the passage of time, said casing being rotatable for simultaneously refilling the hopper of one hour glass after a time indicating period and placing the other hour glass in position for starting flow in said other glass for time indication.

3. In a device of the class described, a casing having hour glasses, one of said hour glasses being inverted with respect to the other and both of said hour glasses having diagonally disposed hoppers and receptacles, discharge openings connecting each of said hoppers with its corresponding receptacle, said receptacles and hoppers respectively being additionally connected by relatively large openings, and a substance carried within said hour glasses, said substance being adapted to flow through the discharge opening of one of said glasses for indicating time passage and being adapted to flow through the relatively large openings as the casing is partially rotated for simultaneously refilling the hopper for a further time passage indication and setting the hopper of said other hour glass in position for permitting time passage indicating flow, the interior of said hour glasses being evacuated.

4. In a device of the class described, a casing including hour glasses having a partition defining a common inner wall, said hour glasses being formed as a unit and being exhausted, each of said hour glasses including a top and bottom wall and a curved wall defining hoppers and receptacle, said curved wall terminating in a relatively large opening leading from said respective hoppers to said respective receptacles, relatively small discharge openings connecting the respective hoppers with the respective receptacles, a substance carried in each of the hour glasses and adapted to flow through the relatively small discharge openings from the hopper of one of said glasses to the receptacle of said glass, and means carried by the casing for rotating said casing within a housing, said casing being invertable for the refilling of a hopper after a time indicating flow and the simultaneous placing of the hopper of the other of said hour glasses in operative position.

5. In a device of the class described, a housing, a casing in the housing and including hour glasses having hoppers and receptacles, said hour glasses being inverted with respect to each other, said hoppers and receptacles being connected by discharge openings and relatively large openings, a substance carried in each of said hour glasses, and means for inverting the casing in said housing, all of said substance in one of said glasses being adapted to flow in one direction through the discharge opening into the receptacle thereof for indicating the passage of time and being adapted to flow through the relatively large opening of said glass back into the hopper from the receptacle after a time passage indicating flow and upon inverting the casing.

6. In a device of the class described, a casing having a pair of adjacently disposed hour glasses mounted in inverted relation to each other, a partition defining a common central wall for said hour glasses, said casing having flat top and bottom walls common to both of said hour glasses, and curved intersecting walls defining hoppers and receptacles for said hour glasses, certain of said curved walls being formed at a point along their length with relatively small openings to permit slow flow of an element therethrough from the hoppers into the receptacles and said curved walls being provided at their corresponding ends with relatively large openings to permit quick passage of the element back into the hoppers from the receptacles after a slow time indicating flow through said relatively small openings.

7. In a device of the class described, a casing including hour glasses each having a hopper and a receptacle, said hour glasses being mounted in inverted position relative to each other and being connected by a common central wall, the hopper and receptacle of each glass being connected by a discharge opening and a relatively large opening, and means extending through the common central wall and permitting mounting of the casing for rotative movement.

STEPHEN G. PENNINGTON.